(12) United States Patent
Farkas et al.

(10) Patent No.: US 11,592,795 B2
(45) Date of Patent: Feb. 28, 2023

(54) SYSTEM AND METHOD OF MANAGING LIQUIDS WITH INFORMATION HANDLING SYSTEMS

(71) Applicant: Dell Products L.P., Round Rock, TX (US)

(72) Inventors: Sandor Farkas, Round Rock, TX (US); Kevin Warren Mundt, Austin, TX (US); Michael J. Stumpf, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 1030 days.

(21) Appl. No.: 16/270,956

(22) Filed: Feb. 8, 2019

(65) Prior Publication Data
US 2020/0256341 A1 Aug. 13, 2020

(51) Int. Cl.
*G05B 19/042* (2006.01)
*F04C 2/08* (2006.01)

(52) U.S. Cl.
CPC ............ *G05B 19/042* (2013.01); *F04C 2/084* (2013.01); *G05B 2219/25257* (2013.01)

(58) Field of Classification Search
CPC ...... G05B 2219/25425; G05B 2219/25; G05B 19/042; G05B 2219/25257; G05B 19/0426; F04C 2/084; F04C 11/001; F04C 2/18
See application file for complete search history.

(56) References Cited

U.S. PATENT DOCUMENTS

| | | | | |
|---|---|---|---|---|
| 9,301,421 B2* | 3/2016 | French, Jr. | ................ | G06F 1/20 |
| 9,852,963 B2* | 12/2017 | Shedd | ........................ | F28F 9/26 |
| 2006/0083636 A1* | 4/2006 | King | ....................... | F16N 13/10 |
| | | | | 417/415 |
| 2007/0059839 A1* | 3/2007 | Goza | .................... | G05D 7/0635 |
| | | | | 436/55 |
| 2009/0201644 A1* | 8/2009 | Kelley | .............. | H05K 7/20781 |
| | | | | 361/699 |
| 2013/0166094 A1* | 6/2013 | Eckberg | ............. | H05K 7/20736 |
| | | | | 700/300 |
| 2014/0124188 A1* | 5/2014 | Xu | .......................... | F25D 31/00 |
| | | | | 165/281 |
| 2016/0312140 A1* | 10/2016 | Krish | ................. | B01D 53/1412 |
| 2017/0009773 A1* | 1/2017 | Marenco | ................. | F04D 13/06 |
| 2017/0248346 A1* | 8/2017 | Creamer | ............... | F04C 29/051 |

(Continued)

*Primary Examiner* — Mohammad Ali
*Assistant Examiner* — Dhruvkumar Patel
(74) *Attorney, Agent, or Firm* — McDermott Will & Emery LLP

(57) ABSTRACT

In one or more embodiments, a liquid management system may include multiple impellers; multiple liquid transfer lines; a first impeller system that includes a first impeller of the multiple impellers; a second impeller system that includes a second impeller of the multiple impellers; and a shaft, coupled to the first impeller system and coupled to the second impeller system and configured to transfer the at least the portion of the energy to the second impeller system. The liquid management system may be configured to be coupled to an information handling system. The first impeller system may be configured to harvest, via rotation of the first impeller, energy from a flow of a liquid. The second impeller system may be configured to create pressure difference between two of the multiple liquid transfer lines coupled to the second impeller system.

20 Claims, 11 Drawing Sheets

(56) References Cited

U.S. PATENT DOCUMENTS

| | | | |
|---|---|---|---|
| 2018/0035569 A1* | 2/2018 | Harrington | H05K 7/20281 |
| 2018/0279507 A1* | 9/2018 | Midgley | H05K 7/20263 |
| 2019/0110375 A1* | 4/2019 | Harrington | F04C 14/04 |

* cited by examiner

SYSTEM AND METHOD OF MANAGING LIQUIDS WITH INFORMATION HANDLING SYSTEMS

BACKGROUND

Field of the Disclosure

This disclosure relates generally to information handling systems and more particularly to managing cooling liquids with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may receive a flow of liquid to cool at least one component of an information handling system; may harvest energy from the flow of the liquid via an impeller of a first impeller system; may transfer, via at least one of a gear and a shaft, at least a portion of the energy from the flow of the liquid to an impeller of a second impeller system, different from the first impeller system; and may rotate, via the at least the portion of the energy, the impeller of the second impeller system to create pressure difference between a first liquid transfer line, coupled to the second impeller system, and a second liquid transfer line, coupled to the second impeller system and coupled to the information handling system. In one or more embodiments, transferring, via the at least one of the gear and the shaft, the at least the portion of the energy from the flow of the liquid to the second impeller may include the shaft rotating to transfer the at least the portion of the energy from the flow of liquid to the second impeller.

In one or more embodiments, a diameter of the impeller of the second impeller system may be equal to a diameter of the impeller of the first impeller system. For example, transferring, via the at least one of the gear and the shaft, the at least the portion of the energy from the flow of the liquid to the impeller of the second impeller system may include transferring, via at least the gear, the at least the portion of the energy from the flow of the liquid to the impeller of the second impeller system. In one instance, for a complete rotation of the impeller of the first impeller system, the gear causes more than a complete rotation of the impeller of the second impeller system. In another instance, for a complete rotation of the impeller of the first impeller system, the gear causes less than a complete rotation of the impeller of the second impeller system. In one or more embodiments, the first impeller system may include multiple impellers that include the impeller of the first impeller system. In one or more embodiments, the second impeller system may include multiple impellers that include the impeller of the second impeller system.

In one or more embodiments, one or more systems, methods, and/or processes may further provide at least a portion of the liquid to a check valve. In one or more embodiments, one or more systems, methods, and/or processes may further determine a first temperature associated with a first liquid transfer line; may further determine a second temperature associated with a second liquid transfer line, different from the first liquid transfer line; may further determine a difference between the second temperature and the first temperature; and may further determine that the difference between the second temperature and the first temperature is greater than or equal to a threshold. In one or more embodiments, one or more systems, methods, and/or processes may further provide an alert. For example, the alert may be provided in response to determining that the difference between the second temperature and the first temperature is greater than or equal to the threshold. In one or more embodiments, one or more systems, methods, and/or processes may further cease the flow of liquid. For example, the flow of the liquid may be ceased in response to determining that the difference between the second temperature and the first temperature is greater than or equal to the threshold.

In one or more embodiments, a liquid management system may include multiple impellers; multiple liquid transfer lines; a first impeller system that includes a first impeller of the multiple impellers; a second impeller system that includes a second impeller of the multiple impellers; and a shaft, coupled to the first impeller system and coupled to the second impeller system. For example, the liquid management system may be configured to be coupled to an information handling system. In one or more embodiments, the first impeller system may be configured to receive a flow of liquid to cool at least one component of the information handling system and to harvest, via rotation of the first impeller, energy from the flow of the liquid. In one or more embodiments, the second impeller system may be configured to rotate, via at least a portion of the energy, the second impeller to create pressure difference between a first liquid transfer line of the multiple liquid transfer lines, coupled to the second impeller system, and a second liquid transfer line of the multiple liquid transfer lines, coupled to the second impeller system and coupled to the information handling system. In one or more embodiments, the shaft may be configured to transfer the at least the portion of the energy to the second impeller system. For example, the shaft may be further configured to rotate to transfer the at least the portion of the energy to the second impeller system.

In one or more embodiments, the liquid management system may include a solenoid configured to prevent a rotation of the first impeller. In one or more embodiments, the liquid management system may include a gear coupled to the shaft. For example, a diameter of the second impeller is equal to a diameter of the first impeller. For instance, for a complete rotation of the first impeller, the gear may cause more than a complete rotation of the second impeller. In one or more embodiments, the liquid management system may include a check valve configured to prevent at least a portion of the liquid from flowing back into the information handling system.

In one or more embodiments, the liquid management system may include a temperature measurement device configured to determine a temperature associated with the second liquid transfer line of the multiple liquid transfer lines. For example, the temperature measurement device may include at least one of a resistance temperature detector, a thermocouple, and a thermistor, among others. In one or more embodiments, the temperature measurement device may be coupled to the second liquid transfer line of the multiple liquid transfer lines. In one or more embodiments, the first impeller system may include two or more impellers of the multiple impellers. In one or more embodiments, the second impeller system may include two or more impellers of the multiple impellers.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
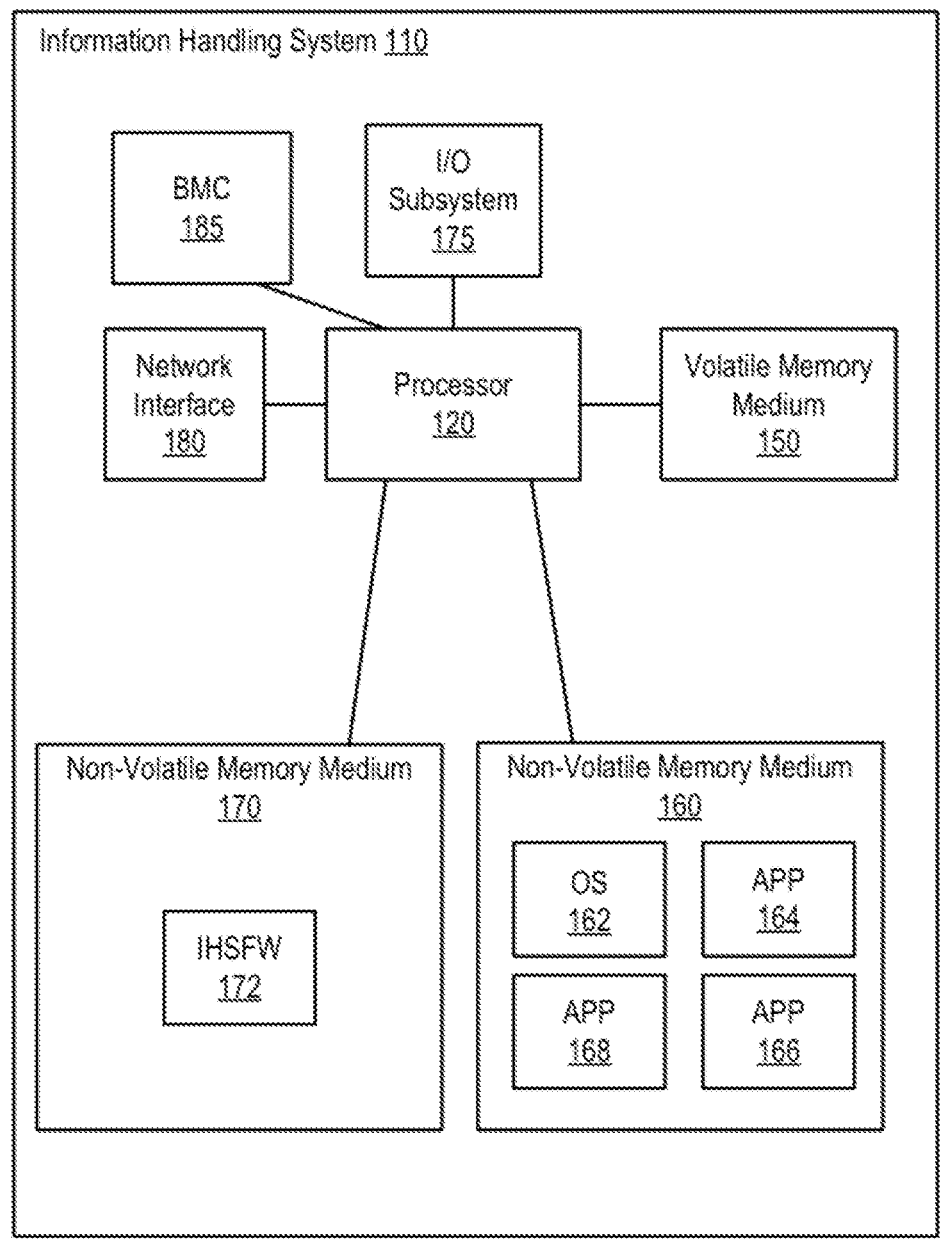
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more components of an information handling system may be cooled. For example, heat may be removed from one or more components of an information handling system. In one or more embodiments, a liquid may be utilized to cool one or more components of an information handling system. For example, a liquid may be utilized to remove heat from one or more components of an information handling system. In one or more embodiments, a liquid utilized to cool and/or remove heat from one or more components of an information handling system may include a mixture of liquids. For example, the mixture of liquids may include a mixture of water ($H_2O$) and glycol. For instance, the mixture of liquids may include a mixture of seventy-five percent (75%) water and twenty-five percent (25%) propylene glycol.

In one or more embodiments, if a leak of a liquid utilized to cool and/or remove heat from one or more components of an information handling system occurs, one or more portions of the information handling system may be damaged. In one example, the one or more portions of the information handling system that may be damaged may include the one or more components of the information handling system. In a second example, the one or more portions of the information handling system that may be damaged may include one or more other components of the information handling system. In another example, the one or more portions of the information handling system that may be damaged may include one or more circuit boards of the information handling system.

In one or more embodiments, the liquid utilized to cool and/or remove heat from one or more components of the information handling system may cause one or more short circuits. For example, the one or more short circuits may damage the one or more portions of the information handling system. In one or more embodiments, the liquid utilized to cool and/or remove heat from one or more components of the information handling system may cause one or more corrosions. In one example, the one or more corrosions may damage the one or more portions of the information handling system. In another example, the information handling system may not function properly due to the one or more corrosions. In one or more embodiments, the leak of the liquid utilized to cool and/or remove heat from the one or more components of an information handling system may be caused by one or more of vibrations, thermal cycles, aging, oxidation, junction sealant decay, and pests, among others.

In one or more embodiments, a liquid management system may include two impeller systems (e.g., pumps). For example, the two impeller systems may be mechanically coupled. For instance, a shaft may mechanically couple the two impeller systems. In one or more embodiments, a first impeller system of the two impeller systems may harvest energy from passing liquid utilized to cool and/or remove heat from one or more components of the information handling system. In one or more embodiments, a second impeller system of the two impeller systems may provide suction based at least on the energy harvested from passing liquid. For example, the shaft that couples the two impeller systems may provide the energy harvested from passing liquid to the second impeller system to generate suction. In one or more embodiments, if a leak of the liquid occurs, the second impeller system may vacuum the liquid from the information handling system. For example, the first impeller system may generate a sufficient amount of energy for the second impeller system to vacuum the liquid from the information handling system. For instance, a negative relative outlet pressure, generated by the second impeller system, may prevent leaks, since the liquid may take the path of least impedance.

In one or more embodiments, with the negative relative outlet pressure, air may be drawn in through a leak area rather than the leak area emitting the liquid. For example, the liquid may be effectively discouraged to leak from the leak area as the second impeller system creates a low pressure that vacuums the liquid from the leak area.

In one or more embodiments, one or more temperature measurement devices may be utilized. In one example, a temperature measurement device may be coupled to a liquid transfer line that transfers exiting liquid. For instance, the liquid transfer line that transfers the exiting liquid may transfer liquid from an information handling system. In another example, a temperature measurement device may be coupled to a liquid transfer line that transfers incoming liquid. For instance, the liquid transfer line that transfers the incoming liquid may transfer liquid to the information handling system. In one or more embodiments, a temperature measurement device may transform a physical temperature into digital data. In one or more embodiments, a temperature measurement device may transform a physical temperature into an analog voltage and/or an analog current. In one or more embodiments, a digital to analog converter may be utilized to transform the analog voltage and/or the analog current into digital data. In one or more embodiments, a temperature measurement device may include one or more of a resistance temperature detector, a thermocouple, and a thermistor, among others.

In one or more embodiments, a difference between a temperature of a liquid transfer line that transfers exiting liquid and a temperature of a liquid transfer line that transfers incoming liquid may be determined. In one example, if the difference between the temperature of the liquid transfer line that transfers exiting liquid and the temperature of the liquid transfer line that transfers incoming liquid is at or below a first threshold, one or more issues may be indicated. In one instance, an issue associated with low liquid flow may be indicated. In a second instance, an issue associated with no liquid flow may be indicated. In a third instance, an issue associated with an information handling system internal issue may be indicated. In another instance, an issue associated with a loose heat removal device may be indicated. In another example, if the difference between the temperature of the liquid transfer line that transfers exiting liquid and the temperature of the liquid transfer line that transfers incoming liquid is at or above a second threshold, one or more issues may be indicated. For instance, a processing load of an information handling system may be indicated. In one or more embodiments, if the processing load of the information handling system is indicated, one or more workloads may be transferred and/or rebalanced. In one example, one or more workloads may be transferred to one or more other information handling systems. In another example, one or more workloads may be rebalanced with one or more other information handling systems. In one or more embodiments, a workload may include one or more of a task, a thread, a process, a program, software, an application, server software, a service, an operating system, a container, and a virtual machine, among others. In one or more embodiments, a container may be or include software in a file system that includes one or more of instructions executable by a processor (e.g., a program, software, an application, server software, a service, etc.), one or more runtime libraries, one or more system tools, and one or more system libraries, among others. For example, a container may be or include a Docker container, a Linux container (LXC), or a Kubernetes pod, among others.

In one or more embodiments, a revolution counter may be utilized with an impeller system. For example, a tachometer may be coupled to an impeller system. For instance, an impeller system may be or include a gear pump. In one or more embodiments, a number of revolutions per a time period of an impeller may be determined. For example, if the number of revolutions per the time period of the impeller is below a threshold, one or more issues may be indicated. In one instance, an issue associated with insufficient liquid flow may be indicated. In a second instance, an issue associated with no liquid flow may be indicated. In a third instance, an issue associated with a clog in a liquid transfer line may be indicated. In another instance, an issue associated with a kink in a liquid transfer line may be indicated. In one or more embodiments, a tachometer may determine a number of revolutions per a time period of an impeller. For example, the tachometer may provide the number of revolutions per the time period of the impeller to one or more of a baseboard management controller and liquid management system, among others.

In one or more embodiments, a mechanism may be utilized to prevent an impeller system from transferring liquid to an information handling system. For example, an issue may be determined, and based at least on the issue, the mechanism may be utilized to prevent the impeller system from transferring liquid to the information handling system. For instance, the mechanism may behave as a valve that may cease flow of liquid to the information handling system. In one or more embodiments, the mechanism may include a rod. For example, the rod may be utilized in preventing an impeller from rotating. For instance, the mechanism may include a solenoid that may engage the rod with the impeller, which may prevent the impeller from rotating. In one or more embodiments, the rod may jam the impeller, which may prevent the impeller from rotating.

In one or more embodiments, the solenoid may be controller via a controller device. For example, the controller device may be or include one or more of a complex logic device, a field programmable gate array, an application specific integrated circuit, and a microcontroller, among others. For instance, the controller device may control the solenoid based at least on one or more issues. In one or more embodiments, the one or more issues may be determined via one or more sensors and/or one or more devices.

In one or more embodiments, multiple information handling systems may utilize a manifold for receiving and providing the liquid. For example, the liquid may be ceased from flowing to an information handling system of the multiple information handling systems so that other information handling systems of the multiple information handling systems with higher thermal load may receive additional liquid flow and/or additional liquid pressure. In one or more embodiments, one or more check valves may be utilized. For example, a check valve may prevent liquid from flowing backwards. For instance, a check valve may prevent liquid from flowing backwards if a leak is present and/or an impeller is prevented from rotating.

In one or more embodiments, liquid flow may be steered. In one example, one or more information handling systems may be determined to require additional cooling. For instance, liquid flow may be steered to the one or more information handling systems that were determined to require additional cooling. In another example, one or more issues associated with one or more liquid transfer lines and/or one or more issues associated with one or more manifolds may be determined. For instance, liquid flow may be steered away from the one or more liquid transfer lines and/or the one or more manifold based at least one the one or more issues associated with the one or more liquid transfer lines and/or the one or more issues associated with the one or more manifolds.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a baseboard management controller (BMC) 185. As illustrated, volatile memory medium 150, non-volatile memory media 160 and 170, I/O subsystem 175, and network interface 180 may be communicatively coupled to processor 120. In one or more embodiments, one or more of volatile memory medium 150, non-volatile memory media 160 and 170, I/O subsystem 175, network interface 180, and BMC 185 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel USB interface, and a Wi-Fi interface, among others.

In one or more embodiments, BMC 185 may be or include a microcontroller. For example, the microcontroller may be or include an 8051 microcontroller, an ARM Cortex-M (e.g., Cortex-M0, Cortex-M05, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be configured, coded, and/or encoded with instructions in accordance with one or more of systems, flowcharts, methods, and/or processes described herein. In one or more embodiments, BMC 185 may be configured to implement at least a portion of one or more systems, one or more flowcharts, one or more methods, and/or one or more processes described herein. In one or more embodiments, BMC 185 may be or include one or more of a field programmable gate array (FPGA) and an ASIC, among others, configured, coded, and/or encoded with instructions in accordance with one or more of systems, one or more flowcharts, one or more methods, and/or one or more processes described herein.

In one or more embodiments, processor 120 and one or more components of IHS 110 may be included in a system-on-chip (SoC). For example, the SoC may include processor 120 and a platform controller hub (not specifically illustrated).

Figure 2A:
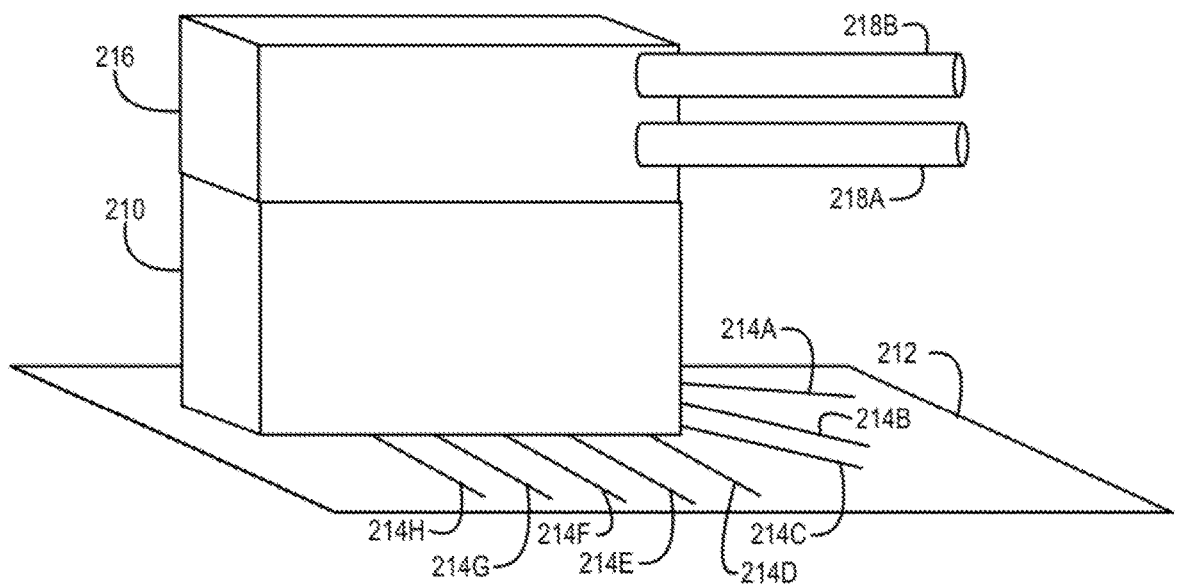
FIG. 2A illustrates an example of a circuit board and a component of an information handling system, according to one or more embodiments.

Turning now to FIG. 2A, an example of a circuit board and a component of an information handling system is illustrated, according to one or more embodiments. As shown, a component 210 may be mounted on a circuit board 212. In one or more embodiments, IHS 110 may include component 210 and circuit board 212. As illustrated, circuit board 212 may include circuit board traces 214A-214H. In one example, one or more of circuit board traces 214A-214H may communicatively couple component 210 to another component of IHS 110. In another example, one or more of circuit board traces 214A-214H may provide power to component 210. As shown, a heat removal device 216 may be mounted to component 210. As illustrated, liquid transfer lines 218A and 218B may be coupled to heat removal device 216. In one example, liquid may be provided to heat removal device 216 via liquid transfer line 218A. In another example, liquid may be received from heat removal device 216 via liquid transfer line 218B. For instance, liquid may be removed from heat removal device 216 via liquid transfer line 218B. In one or more embodiments, a liquid transfer line 218 may be or include one or more of a liquid transfer duct, a liquid transfer conduit, a liquid transfer tube, a liquid transfer hose, and a liquid transfer pipe, among others. In one or more embodiments, heat removal device 216 may remove heat from component 210. In one or more embodiments, liquid may remove heat from heat removal device 216. For example, liquid may remove the heat that heat removal device 216 removed heat from component 210.

Figure 2B:
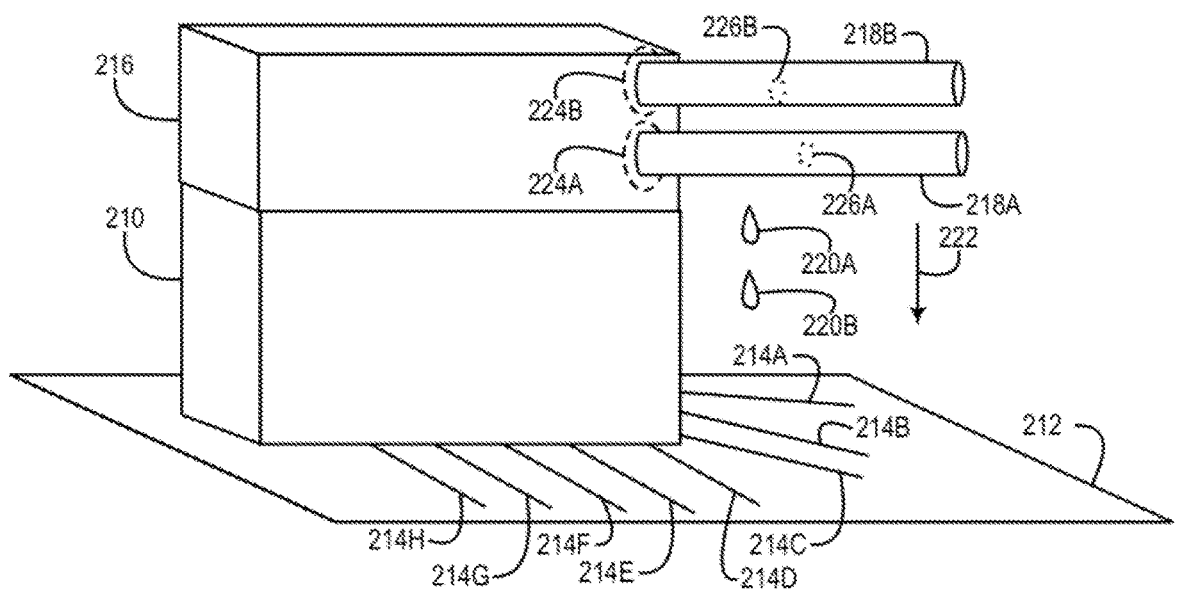
FIG. 2B illustrates another example of a circuit board and a component of an information handling system, according to one or more embodiments.

Turning now to FIG. 2B, another example of a circuit board and a component of an information handling system is illustrated, according to one or more embodiments. As shown, liquid drops 220A and 220B may have leaked. For example, liquid drops 220A and 220B may move in a direction of a gravitational force vector 222. In one or more embodiments, one or more of heat removal device 216 and liquid transfer lines 218A and 218B may be above circuit board 212 and/or component 210 with respect to gravitational force vector 222. For example, one or more of heat removal device 216 and liquid transfer lines 218A and 218B may be above circuit board 212 and/or component 210 if liquid was released from the one or more of heat removal device 216 and liquid transfer lines 218A and 218B and flow in a direction of gravitational force vector 222. For instance, the one or more of heat removal device 216 and liquid transfer lines 218A and 218B may be above circuit board 212 and/or component 210 if liquid was released from the one or more of heat removal device 216 and liquid transfer lines 218A and 218B and flow in a path that include a direction of gravitational force vector 222.

In one or more embodiments, liquid may leak from a junction 224 of heat removal device 216 and liquid transfer line 218. In one example, one or more of liquid drops 220A and 220B may leak from a junction 224A. In another example, one or more of liquid drops 220A and 220B may leak from a junction 224B. In one or more embodiments, liquid may leak from a liquid transfer line portion 226. In one example, one or more of liquid drops 220A and 220B may leak from a liquid transfer line portion 226A. In another example, one or more of liquid drops 220A and 220B may leak from a liquid transfer line portion 226B. In one or more embodiments, one or more of liquid drops 220A and 220B may leak onto circuit board 212. Liquid drops 220A and 220B may leak from other areas that are not specifically illustrated, according to one or more embodiments.

Figure 3:
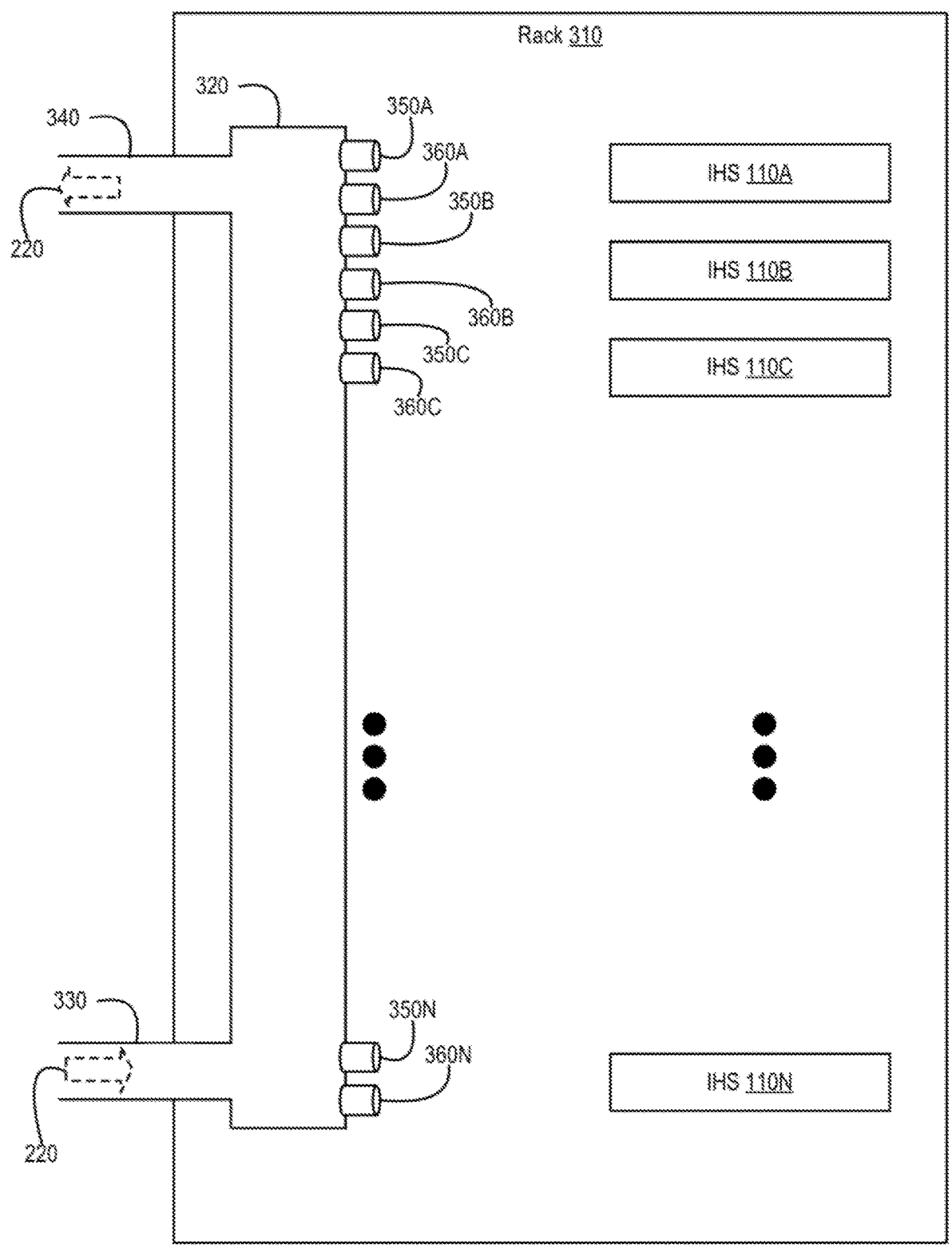
FIG. 3 illustrates an example of a rack, according to one or more embodiments.

Turning now to FIG. 3, an example of a rack is illustrated, according to one or more embodiments. As shown, a rack 310 may house information handling systems (IHSs) 110A-110N. As illustrated, rack 310 may include a liquid distribution line 320. In one or more embodiments, liquid distribution line 320 may be or include a liquid distribution column. As shown, liquid 220 may enter liquid distribution line 320 via a liquid distribution line 330. As illustrated, liquid 220 may exit liquid distribution line 320 via a liquid distribution line 340. As shown, taps 350A-350N may be coupled to liquid distribution line 320. In one or more embodiments, a tap 350 may provide liquid 220 to an IHS 110. As illustrated, taps 360A-360N may be coupled to liquid distribution line 320. In one or more embodiments, a tap 360 may receive liquid 220 from an IHS 110.

Figure 4A:
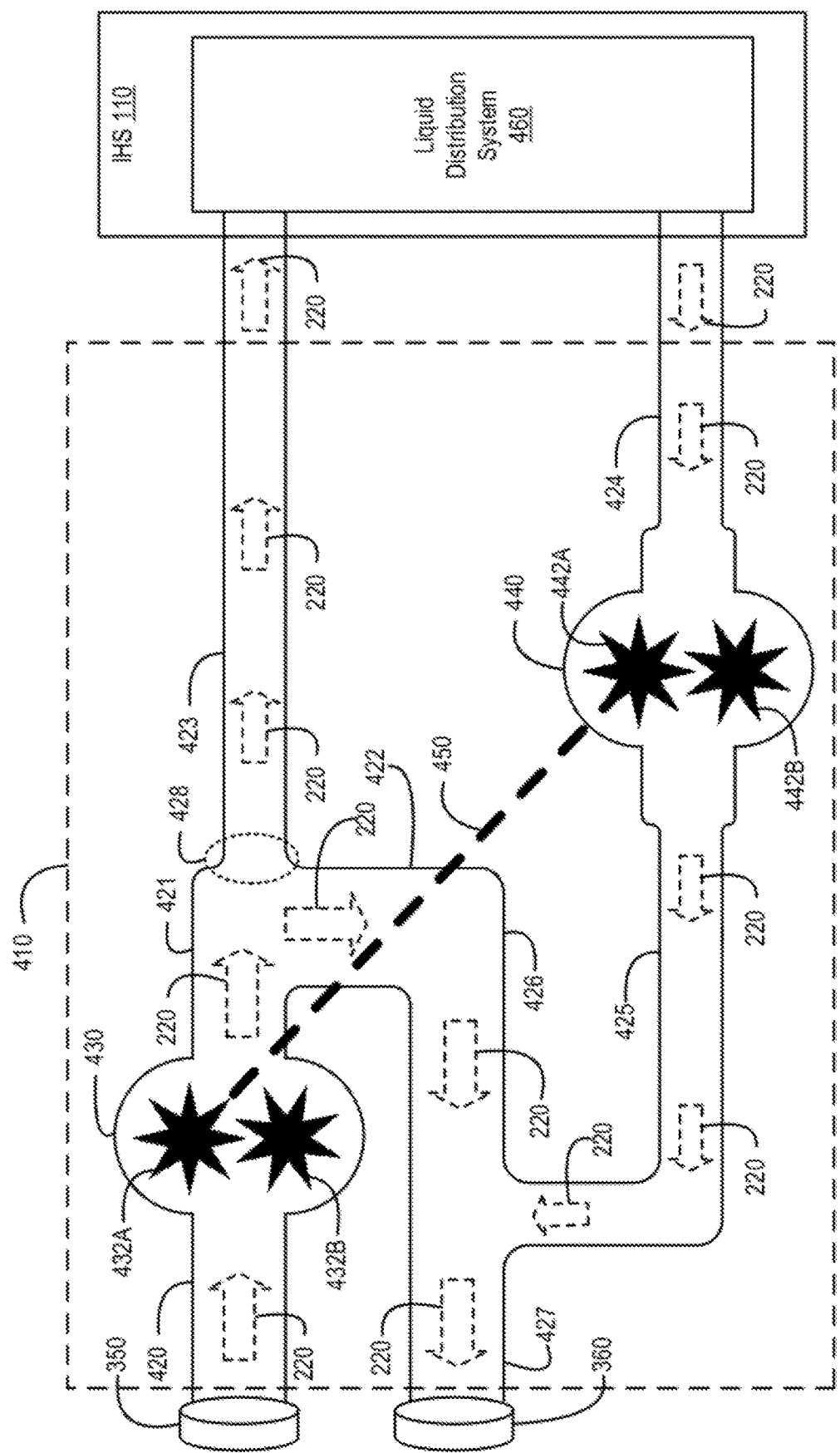
FIG. 4A illustrates an example of liquid management system and an information handling system, according to one or more embodiments.

Turning now to FIG. 4A, an example of liquid management system and an information handling system is illustrated, according to one or more embodiments. As shown, a liquid management system 410 may include liquid transfer lines 420-427 and impeller systems 430 and 440. As illustrated, liquid 220 may travel into liquid transfer line 420. For example, liquid 220 may travel into liquid management system 410 via liquid transfer line 420. As shown, liquid transfer line 420 may be coupled to tap 350. As illustrated, liquid 220 may travel into impeller system 430. As shown, impeller system 430 may include impellers 432A and 432B. Although impeller system 430 is illustrated with multiple impellers, impeller system 430 may include and/or function with a single impeller 432. In one or more embodiments, liquid 220 may travel into impeller system 430 and may cause impellers 432A and 432B to rotate. For example, liquid 220 may be pressurized.

As illustrated, liquid 220 may travel to liquid transfer line 421. As shown, liquid 220 may travel to one or more of liquid transfer lines 422 and 423. In one or more embodiments, a restriction 428 may be located at an end of liquid transfer line 423. In one example, liquid transfer line 423 may have a smaller diameter than liquid transfer line 421. In another example, liquid transfer line 423 may have a smaller diameter than liquid transfer line 422. In one or more embodiments, restriction 428 may have a smaller diameter than liquid transfer line 421. For example, restriction 428 may be a device coupled to liquid transfer lines 421 and 423.

For instance, a diameter of liquid transfer line 421 and a diameter of liquid transfer line 423 may be equal. As shown, liquid 220 may travel into IHS 110 via liquid transfer line 423. As illustrated, liquid 220 may travel into a liquid distribution system 460 of IHS 110 via liquid transfer line 423. In one or more embodiments, liquid distribution system 460 may distribute liquid 220 to one or more heat removal devices 216 to remove heat from one or more components of IHS 110. For example, liquid distribution system 460 may include one or more removal devices 216 and/or one or more liquid transfer lines 218, among others.

As shown, liquid 220 may travel from IHS 110 via liquid transfer line 424. As illustrated, liquid 220 may travel from liquid distribution system 460 of IHS 110 via liquid transfer line 424. In one or more embodiments, a temperature of liquid traveling via liquid transfer line 424 may be greater than a temperature of liquid traveling via liquid transfer line 423. As shown, liquid 220 may travel into impeller system 440. As illustrated, impeller system 440 may include impellers 442A and 442B. In one or more embodiments, an impeller 440 may be smaller than an impeller 430. In one or more embodiments, impeller 440 may rotate at a lower rate of rotation than impeller 430. As shown, liquid 220 may travel into liquid transfer line 425. As illustrated, liquid 220 may travel from liquid transfer line 422 into liquid transfer line 426. As shown, liquid 220 may travel from liquid transfer line 426 into liquid transfer line 427. As illustrated, liquid 220 may travel from liquid transfer line 425 into liquid transfer line 427. As shown, liquid 220 may travel from liquid management system 410 though liquid transfer line 427. For example, liquid 220 may travel exit liquid management system 410 via liquid transfer line 427. As illustrated, liquid transfer line 427 may be coupled to tap 360.

As shown, a shaft 450 may be coupled to impeller system 430 and may be coupled to impeller system 440. In one or more embodiments, impeller system 430 may cause shaft 450 to rotate. For example, impeller system 430 may drive shaft 450. For instance, impeller system 430 may harvest energy from a flow of liquid 220 to rotate shaft 450. In one or more embodiments, shaft 450 may cause impellers 442A and 442B to rotate. For example, shaft 450 may drive impellers 442A and 442B. In one or more embodiments, there may be a one to one association with a rotation of impeller 432A and impeller 442A. In one or more embodiments, there may be a one to one association with a rotation of impeller 432B and impeller 442B. In one or more embodiments, other associations of rotations of impellers of impeller system 430 and impellers of impeller system 440 may be utilized. For example, an association of rotations of impellers of impeller system 430 and impellers of impeller system 440 that may be utilized may cause impeller system 440 to produce a vacuum of liquid transfer line 424. In one or more embodiments, impeller system 430 may harvest an amount of energy from a flow of liquid 220. For example, impeller system 430 may harvest a first amount of energy from a flow of liquid 220. For instance, impeller system 440 may consume a second amount of energy. In one or more embodiments, the first amount of energy from the flow of liquid 220 may be greater than the second amount of energy consumed by impeller system 440. In one or more embodiments, impeller system 430 may be configured to harvest an amount of energy from a flow of liquid 220 that is greater than an amount of energy that is consumed by impeller system 440.

In one or more embodiments, if a leak of liquid 220 occurs in one or more of liquid transfer line 423, liquid transfer line 424, and liquid distribution system 460, among others, impeller system 440 may extract liquid 220 from the one or more of liquid transfer line 423, liquid transfer line 424, and liquid distribution system 460, among others. For example, impeller system 440 may act as a suction pump if a leak of liquid 220 occurs in the one or more of liquid transfer line 423, liquid transfer line 424, and liquid distribution system 460, among others. For instance, impeller system 440 may create pressure difference between liquid transfer line 424 and liquid transfer line 425. In one or more embodiments, a pressure associated with liquid transfer line 424 may be lower than a pressure associated with liquid transfer line 425. For example, if a leak of liquid 220 occurs in the one or more of liquid transfer line 423, liquid transfer line 424, and liquid distribution system 460, among others, impeller system 440 may cause a pressure associated with liquid transfer line 424 to be lower than a pressure associated with liquid transfer line 425. In one instance, rotating an impeller 442 may cause a pressure associated with liquid transfer line 424 to be lower than a pressure associated with liquid transfer line 425. In another instance, rotating an impeller 442 may cause a pressure associated with liquid transfer line 424 to be lower than atmospheric pressure (e.g., lower than one atmosphere of pressure, lower than 14.7 pounds per square inch, etc.). In this fashion, a leak of liquid 220 may be prevented, according to one or more embodiments.

Figure 4B:
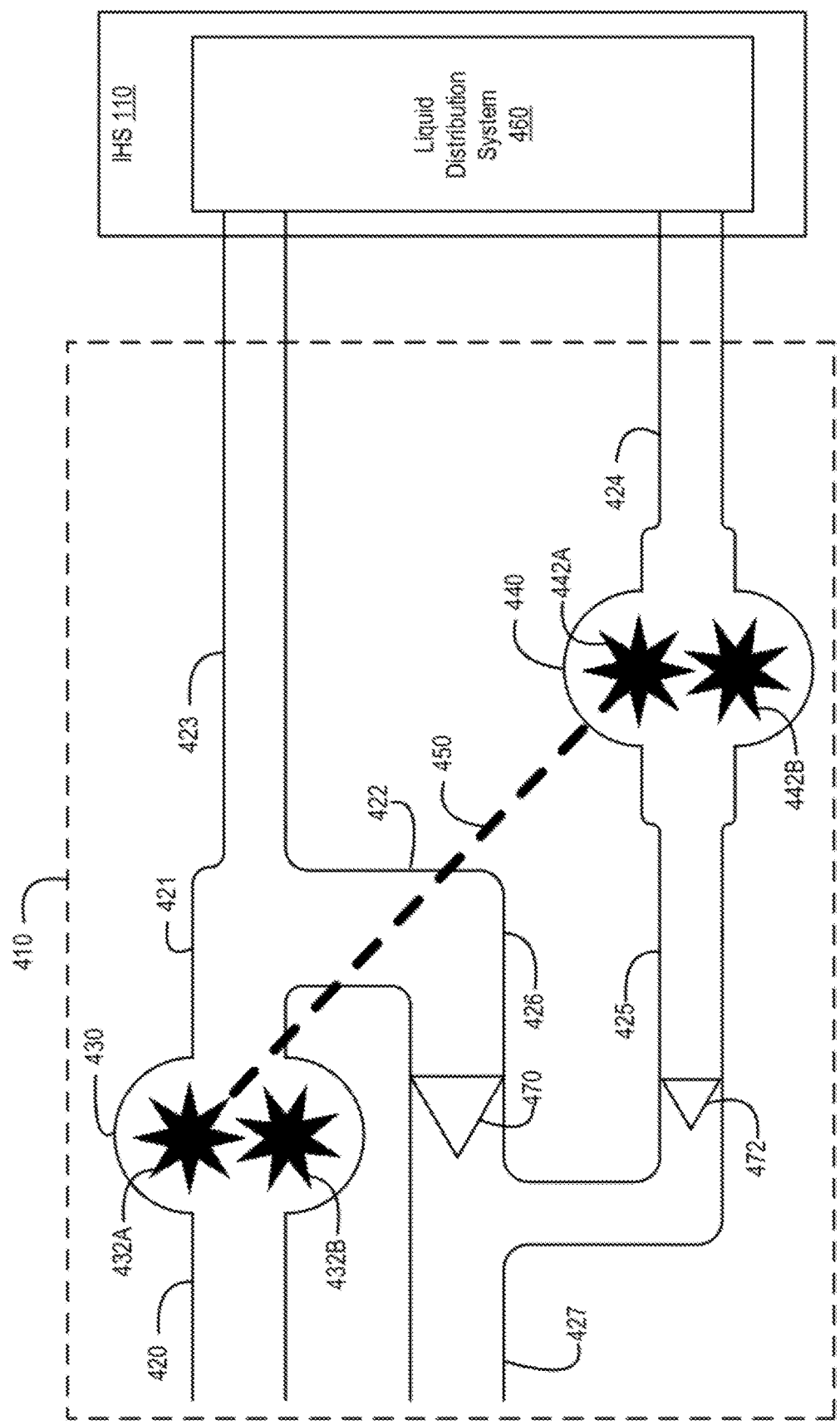
FIG. 4B illustrates a second example of liquid management system and an information handling system, according to one or more embodiments.

Turning now to FIG. 4B, a second example of a liquid management system and an information handling system is illustrated, according to one or more embodiments. As shown, liquid management system 410 may include check valves 470 and 472. In one or more embodiments, if rotation of one or more of impellers of impeller system 430 is stopped, one or more of check valves 470 and 472 may prevent liquid 220 from flowing into liquid distribution system 460. For example, one or more of check valves 470 and 472 may prevent backflow of liquid 220. As illustrated, check valve 470 may be located at or within liquid transfer line 426. As shown, check valve 472 may be located at or within liquid transfer line 425. In one or more embodiments, a check valve may restrict liquid 220 from traveling in a direction. In one example, check valve 470 may restrict liquid 220 from traveling in a direction opposite of the arrows illustrated in FIG. 4A. For instance, check valve 470 may restrict liquid 220 from flowing into liquid distribution system 460 when one or more impellers of impeller system 430 are not rotating. In another example, check valve 472 may restrict liquid 220 from traveling in a direction opposite of the arrows illustrated in FIG. 4A.

Figure 4C:
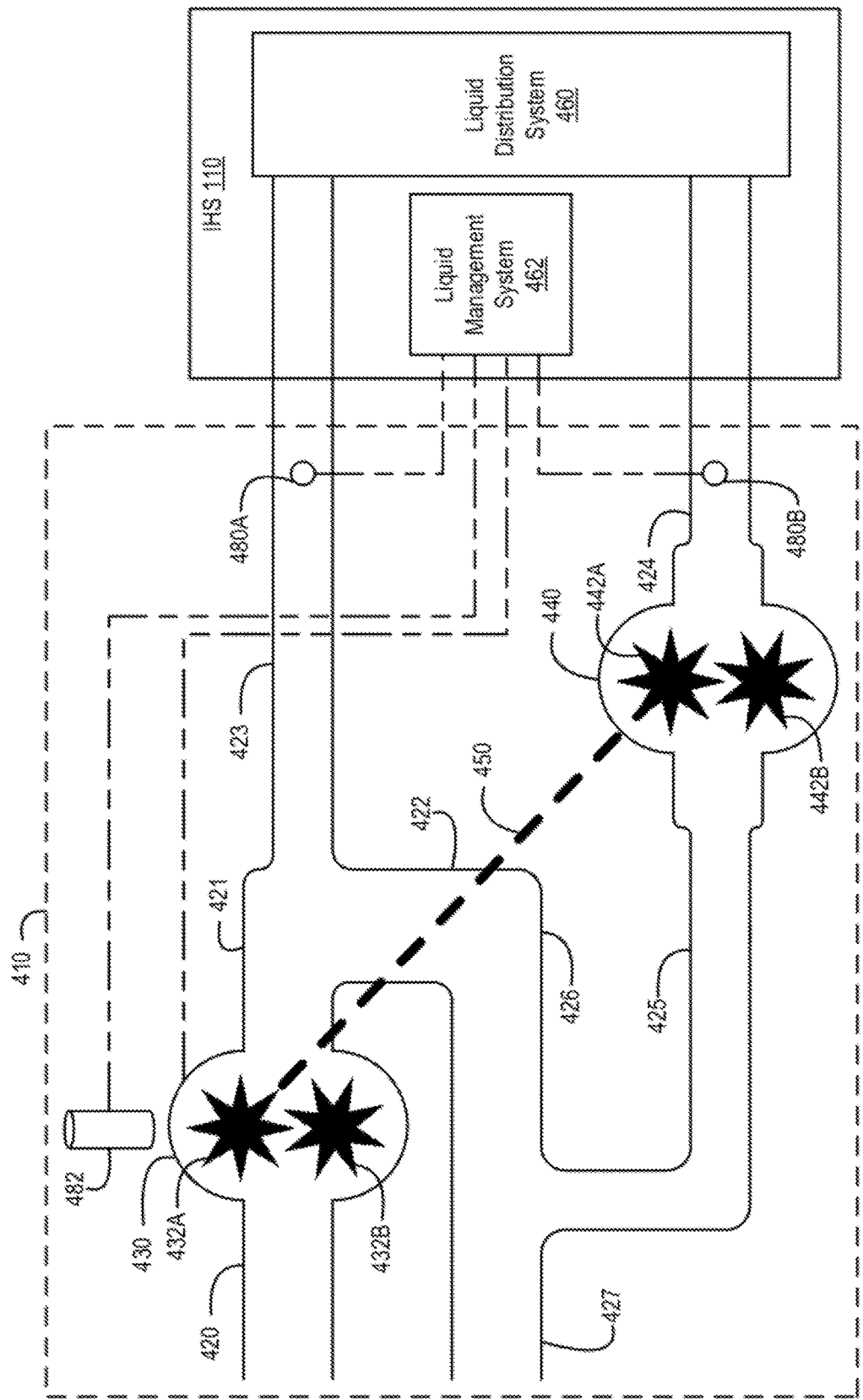
FIGS. 4C and 4D illustrate other examples of a liquid management system and an information handling system, according to one or more embodiments.
Figure 4D:
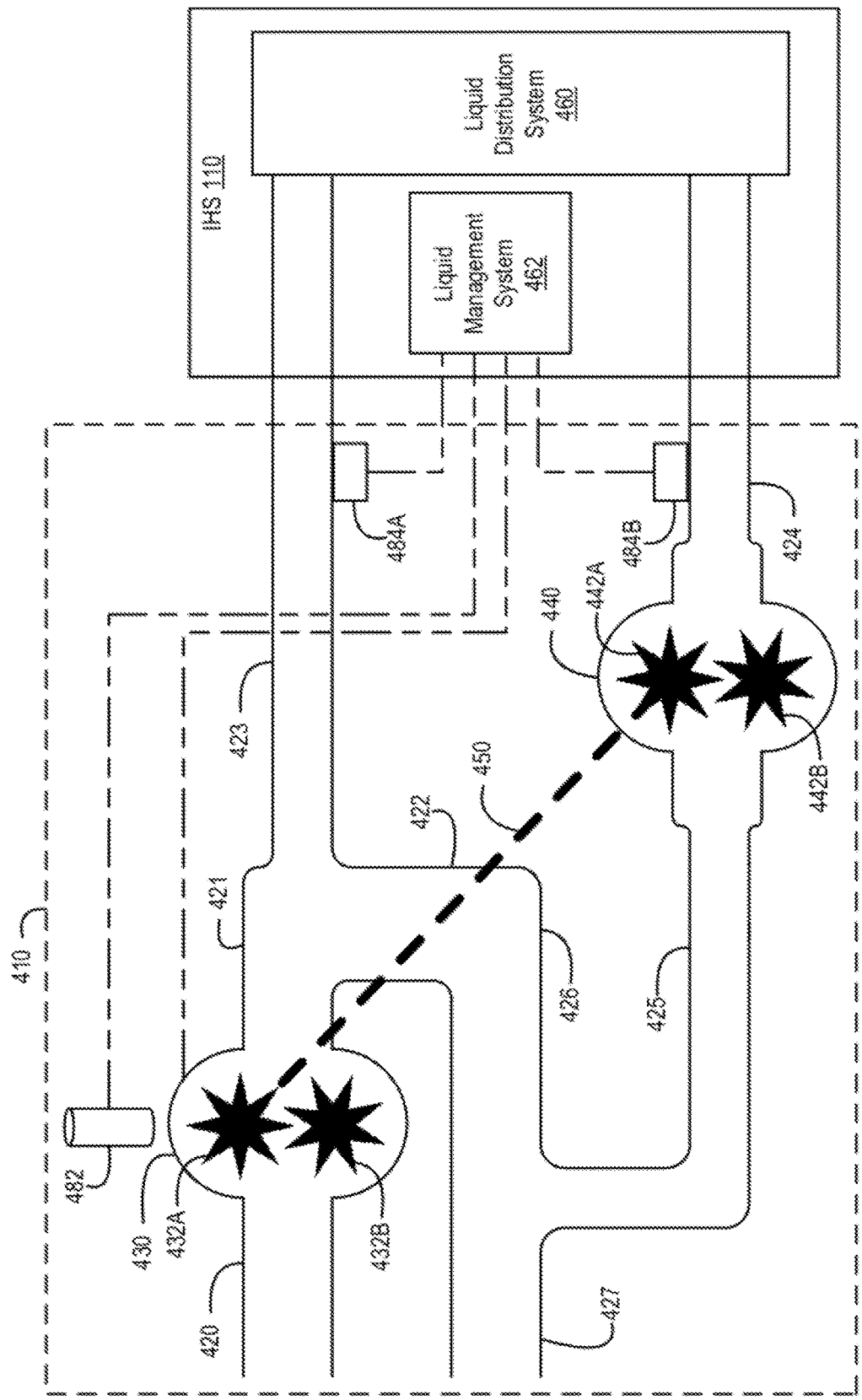

Turning now to FIGS. 4C and 4D, other examples of a liquid management system and an information handling system are illustrated, according to one or more embodiments. As shown, IHS 110 may include a liquid management system 462. In one or more embodiments, liquid management system 462 may be communicatively coupled to processor 120. In one or more embodiments, liquid management system 462 may be communicatively coupled to BMC 185. In one or more embodiments, BMC 185 may include liquid management system 462.

As illustrated in FIG. 4C, liquid management system 410 may include temperature measurement devices 480A and 480B. In one example, temperature measurement device 480A may be inside liquid transfer line 423. In another example, temperature measurement device 480B may be inside liquid transfer line 424. As shown in FIG. 4D, liquid management system 410 may include temperature measurement devices 484A and 484B. In one example, temperature measurement device 484A may be coupled to liquid transfer line 423. In another example, temperature measurement device 484B may be coupled to liquid transfer line 424.

As illustrated, liquid management system 410 may include a solenoid 482. As shown in FIG. 4C, liquid management system 462 may be communicatively coupled to temperature measurement devices 480A and 480B, solenoid 482, and impeller system 430. As illustrated in FIG. 4D, liquid management system 462 may be communicatively coupled to temperature measurement devices 484A and 484B, solenoid 482, and impeller system 430. In one or more embodiments, impeller system 430 may include one or more rotation sensors. For example, liquid management system 462 may receive rotation data from the one or more rotation sensors. For instance, the rotation data may include revolutions per minute (RPM) data. In one or more embodiments, the RPM data may include a number of revolutions per minute of an impeller 432. In one or more embodiments, a revolution counter may be utilized with an impeller system. For example, a tachometer may be coupled to an impeller system. For instance, the tachometer may be coupled to one or more of BMC 185 and liquid management system 462, among others. In one or more embodiments, a tachometer may determine a number of revolutions per a time period of an impeller. For example, the tachometer may provide the number of revolutions per the time period of the impeller to one or more of BMC 185 and liquid management system 462, among others.

In one or more embodiments, liquid management system 462 may engage solenoid 482. For example, solenoid 482 may stop impellers 432A and 432B from rotating. In one or more embodiments, liquid management system 462 may disengage solenoid 482. For example, solenoid 482 may permit impellers 432A and 432B to rotate. In one instance, utilizing solenoid 482 to permit impellers 432A and 432B to rotate may provide a fail safe mode (e.g., to stop or inhibit a flow of liquid 220) if an issue develops with IHS 110 and/or one or more components of IHS 1. In another instance, utilizing solenoid 482 to permit impellers 432A and 432B to rotate may provide a fail safe mode, which may ensure that IHS 110 is ready and/or capable of utilizing liquid 220.

Figure 4E:
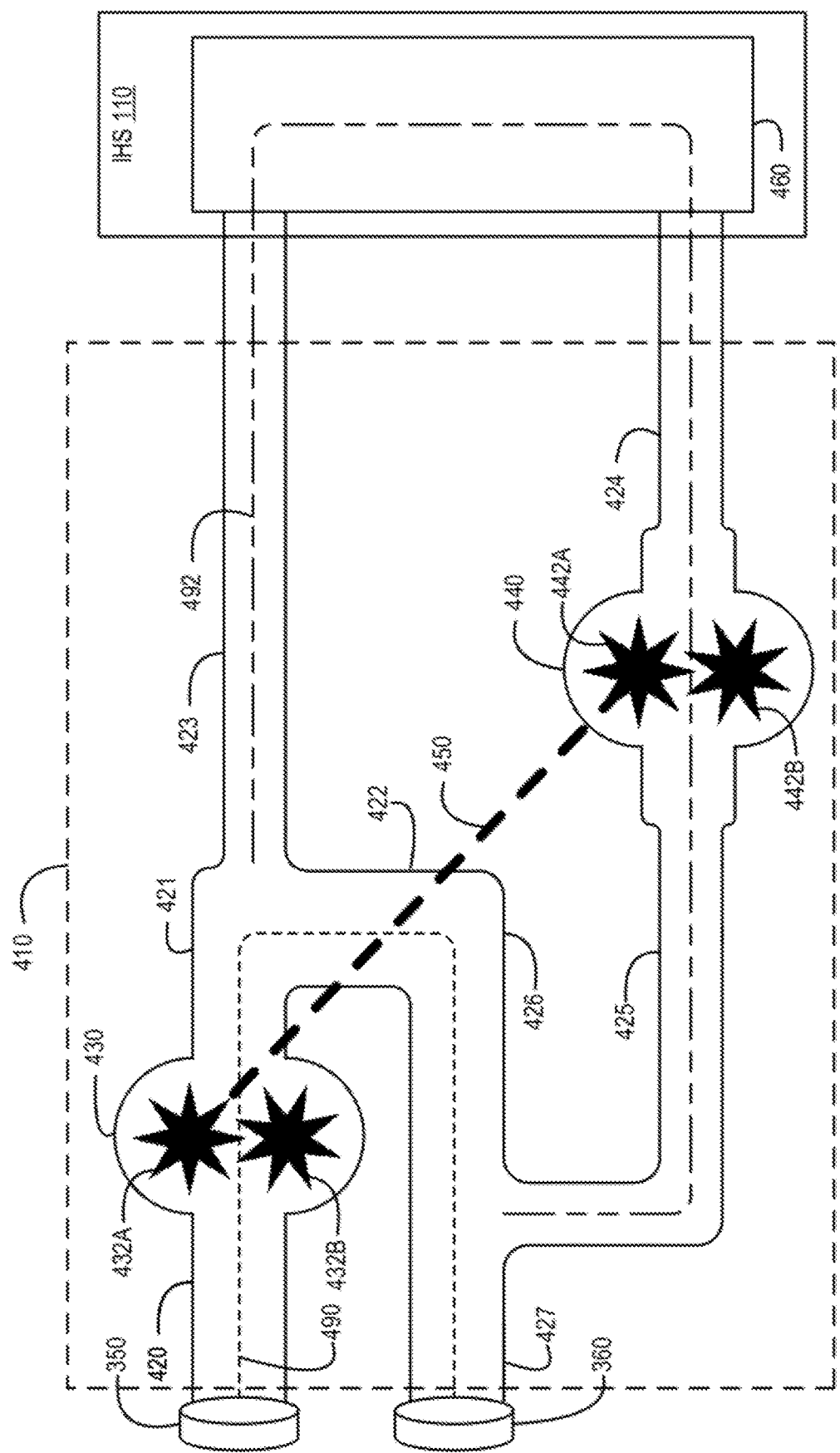
FIG. 4E illustrates examples of flow loops of a liquid management system, according to one or more embodiments.

Turning now to FIG. 4E, examples of flow loops of a liquid management system are illustrated, according to one or more embodiments. As shown, a flow loop 490 may be formed via liquid transfer line 420, impeller system 430, and liquid transfer lines 421, 422, 426, and 427. As illustrated, a flow loop 492 may be formed via liquid transfer line 423, liquid distribution system 460, liquid transfer line 424, impeller system 440, and liquid transfer line 425. In one or more embodiments, a flow loop may be referred to as a circuit. For example, a flow loop may be referred to as a fluid circuit.

Figure 5:
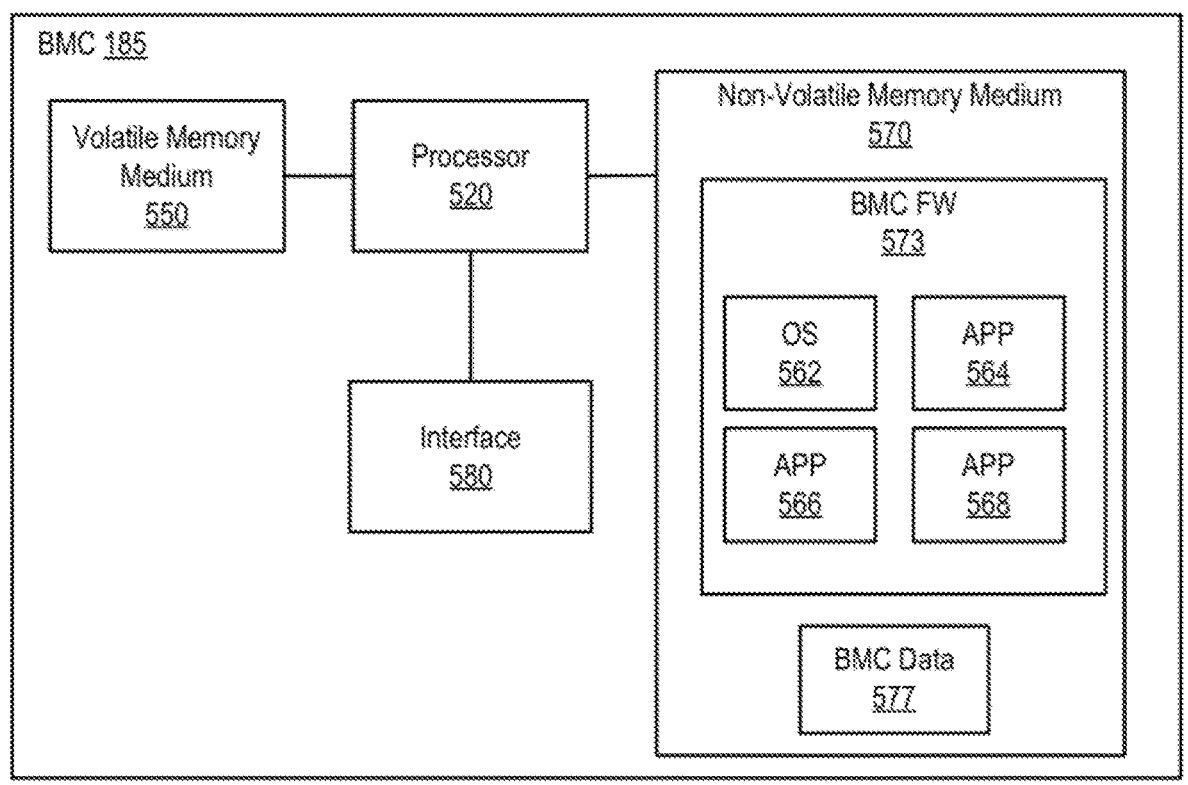
FIG. 5 illustrates an example of a baseboard management controller, according to one or more embodiments.

Turning now to FIG. 5, an example of a baseboard management controller is illustrated, according to one or more embodiments. As shown, BMC 185 may include a processor 520, a volatile memory medium 550, a non-volatile memory medium 570, and an interface 580. As illustrated, non-volatile memory medium 570 may include a BMC firmware (FW) 574, which may include an OS 562 and APPs 564-568, and may include BMC data 577. In one example, OS 562 may be or include a real-time operating system (RTOS). In another example, OS 562 may be or include an Unix-like operating system. Although not specifically illustrated, BMC 185 may include circuitry 230, according to one or more embodiments.

In one or more embodiments, interface 580 may include circuitry that enables communicatively coupling to one or more devices. In one example, interface 580 may include circuitry that enables communicatively coupling to one or more buses. For instance, the one or more buses may include one or more buses described herein, among others. In a second example, interface 580 may include circuitry that enables one or more interrupt signals to be received. In one instance, interface 580 may include general purpose input/output (GPIO) circuitry, and the GPIO circuitry may enable one or more interrupt signals to be received and/or provided via at least one interrupt line. In another instance, interface 580 may include GPIO circuitry that may enable BMC 185 to provide and/or receive signals associated with other circuitry (e.g., diagnostic circuitry, etc.). In a third example, interface 580 may include circuitry that enables communicatively coupling to one or more networks. In one instance, interface 580 may include circuitry that enables communicatively coupling to network interface 180. In a fourth example, interface 580 may include a network interface. In another example, interface 580 may include an analog to digital converter (ADC). For instance, the ADC may transform an analog signal into one or more digital numbers. In one or more embodiments, interface 580 may be coupled to one or more of temperature measurement devices 480A and 480B, among others. In one or more embodiments, interface 580 may be coupled to one or more of temperature measurement devices 484A and 484B, among others.

In one or more embodiments, one or more of OS 562 and APPs 564-568 may include processor instructions executable by processor 520. In one example, processor 520 may execute processor instructions of one or more of OS 562 and APPs 564-568 via non-volatile memory medium 570. In another example, one or more portions of the processor instructions of the one or more of OS 562 and APPs 564-568 may be transferred to volatile memory medium 550, and processor 520 may execute the one or more portions of the processor instructions of the one or more of OS 562 and APPs 564-568 via volatile memory medium 550. In one or more embodiments, processor 520 may execute instructions in accordance with one or more of systems, flowcharts, methods, and/or processes described herein. For example, non-volatile memory medium 570 and/or volatile memory medium 560 may store instructions that may be executable in accordance with one or more of systems, flowcharts, methods, and/or processes described herein. In one or more embodiments, processor 520 may execute instructions in accordance with at least a portion of one or more of systems, flowcharts, methods, and/or processes described herein. For example, non-volatile memory medium 570 and/or volatile memory medium 560 may store instructions that may be executable in accordance with at least a portion of one or more of systems, flowcharts, methods, and/or processes described herein. In one or more embodiments, processor 520 may utilize BMC data 577. In one example, processor 520 may utilize BMC data 577 via non-volatile memory medium 570. In another example, one or more portions of BMC data 577 may be transferred to volatile memory medium 550, and processor 520 may utilize BMC data 577 via volatile memory medium 550.

Figure 6:
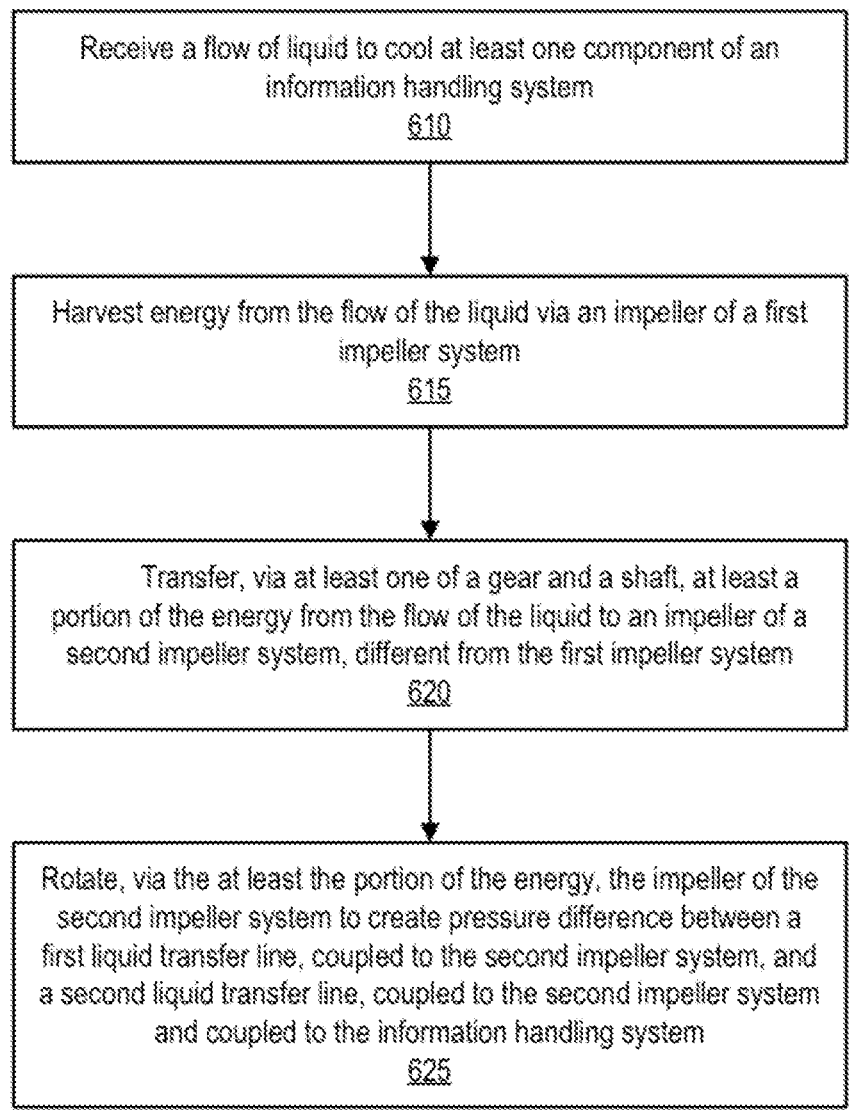
FIG. 6 illustrates an example of a method of operating a liquid management system, according to one or more embodiments.

Turning now to FIG. 6, an example of a method of operating a liquid management system is illustrated, according to one or more embodiments. At 610, a flow of liquid, to cool at least one component of an information handling system, may be received. For example, liquid management system 410 may receive a flow of liquid 220 to cool at least one component of IHS 110 that includes liquid distribution system 460 to distribute the liquid to cool the at least one component. For instance, liquid management system 410 may receive a flow of liquid 220 from tap 350.

At 615, energy from the flow of the liquid may be harvested via an impeller of a first impeller system. For example, energy from the flow of liquid 220 may be harvested via impeller 432A of impeller system 430. At 620, at least a portion of the energy from the flow of the liquid may be transferred, via at least one of a gear and a shaft, to an impeller of a second impeller system, different from the first impeller system. For example, at least a portion of the energy from the flow of liquid 220 may be transferred to impeller 442A.

At 625, the impeller of the second impeller system may be rotated, via the at least the portion of the energy, to create pressure difference between a first liquid transfer line, coupled to the second impeller system, and a second liquid transfer line, coupled to the second impeller system and coupled to the information handling system. For example, impeller 442A of impeller system 440 may be rotated, via the at least the portion of the energy, to create pressure difference between liquid transfer line 425, coupled to impeller system 440, and liquid transfer line 424, coupled to impeller system 440 and coupled to IHS 110. For instance, pressure within liquid transfer line 425 may be greater than pressure within liquid transfer line 424.

In one or more embodiments, a diameter of the impeller of the second impeller system may be equal to a diameter of the impeller of the first impeller system. For example, a diameter of impeller 442A may be equal to a diameter of impeller 432A. In one or more embodiments, transferring, via the at least one of the gear and the shaft, the at least the portion of the energy from the flow of the liquid to the impeller of the second impeller system may include transferring, via at least the gear, the at least the portion of the energy from the flow of the liquid to the impeller of the second impeller system. In one example, for a complete rotation of the impeller of the first impeller system, the gear may cause more than a complete rotation of the impeller of the second impeller system. For instance, for a complete rotation of impeller 432A, the gear may cause more than a complete rotation of impeller 442A. In another example, for a complete rotation of the impeller of the first impeller system, the gear may cause less than a complete rotation of the impeller of the second impeller system. For instance, for a complete rotation of impeller 432A, the gear may cause less than a complete rotation of impeller 442A. If a diameter of impeller 432A and a diameter of impeller 442A are equal, the gear may cause less than a complete rotation of impeller 442A for a complete rotation of impeller 432A, according to one or more embodiments. In one or more embodiments, liquid management system 410 may include a clutch that may permit impeller system 440 to utilize less energy than impeller system 430 generates. For example, the clutch may limit an amount of energy that management system 410 may utilize.

In one or more embodiments, transferring, via the at least one of the gear and the shaft, the at least the portion of the energy from the flow of the liquid to the second impeller may include the shaft rotating to transfer the at least the portion of the energy from the flow of liquid to the second impeller. For example, shaft 450 may rotate to transfer the at least the portion of the energy from the flow of liquid 220 to impeller 442A.

In one or more embodiments, the first impeller system may include multiple impellers that include the impeller of the first impeller system. For example, impeller system 430 may include multiple impellers that that include impeller 432A. In one or more embodiments, the second impeller system may include multiple impellers that include the impeller of the second impeller system. For example, impeller system 440 may include multiple impellers that that include impeller 442A.

In one or more embodiments, the liquid distribution system may include one or more check valves. For example, at least a portion of the liquid to a check valve of the one or more check valves. In one instance, at least a portion of liquid 220 may be provided to check valve 470. In another instance, at least a portion of liquid 220 may be provided to check valve 472.

Figure 7A:
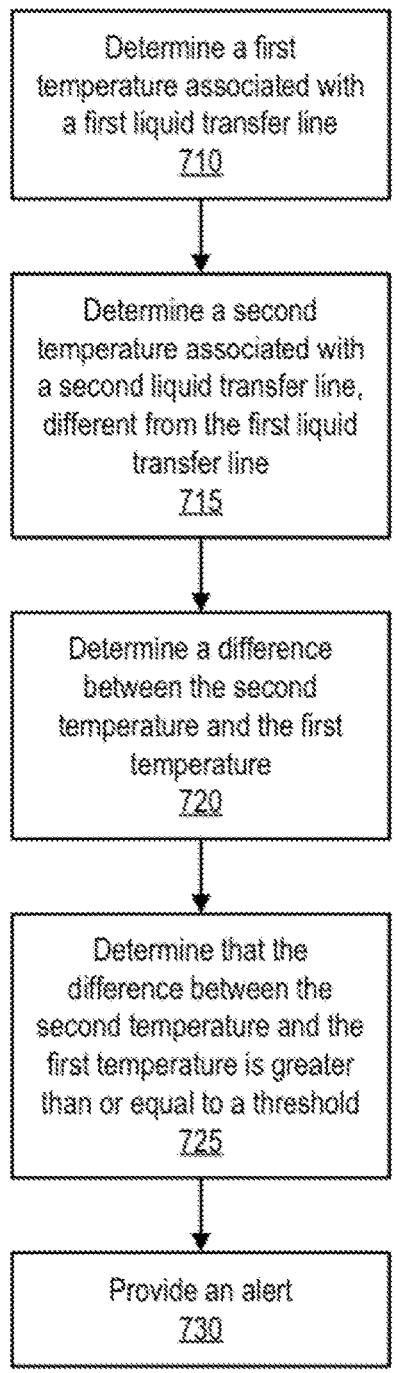
FIG. 7A illustrates an example of a second method of operating a liquid management system, according to one or more embodiments.

Turning now to FIG. 7A, an example of a second method of operating a liquid management system is illustrated, according to one or more embodiments. At 710, a first temperature associated with a first liquid transfer line may be determined. For example, the first liquid transfer line may transfer liquid to cool at least one component of an information handling system that includes a liquid distribution system to distribute the liquid to cool the at least one component. For instance, a first temperature associated with liquid transfer line 423 may be determined.

In one or more embodiments, the first temperature associated with the first liquid transfer line may be a temperature of the liquid inside the first liquid transfer line. For example, temperature measurement device 480A may be utilized in determining the first temperature associated with the first liquid transfer line. In one or more embodiments, the first temperature associated with the first liquid transfer line may be a temperature of the first liquid transfer line. For example, temperature measurement device 484A may be utilized in determining the first temperature associated with the first liquid transfer line. In one or more embodiments, liquid management system 462 may determine the first temperature associated with the first liquid transfer line. In one or more embodiments, BMC 185 may determine the first temperature associated with the first liquid transfer line. In one or more embodiments, BMC 185 may include liquid management system 462.

At 715, a second temperature associated with a second liquid transfer line, different from the first liquid transfer line, may be determined. For example, the second liquid transfer line may be coupled to an egress tap of the liquid distribution system. For instance, a second temperature associated with liquid transfer line 424 may be determined. In one or more embodiments, the second temperature associated with the second liquid transfer line may be a temperature of the liquid inside the second liquid transfer line. For example, temperature measurement device 480B may be utilized in determining the second temperature associated with the second liquid transfer line. In one or more embodiments, the second temperature associated with the second liquid transfer line may be a temperature of the second liquid transfer line. For example, temperature measurement device 484B may be utilized in determining the second temperature associated with the second liquid transfer line. In one or more embodiments, liquid management system 462 may determine the second temperature associated with the second liquid transfer line. In one or more embodiments, BMC 185 may determine the second temperature associated with the second liquid transfer line. In one or more embodiments, BMC 185 may include liquid management system 462.

At 720, a difference between the second temperature and the first temperature may be determined. In one example, liquid management system 462 may determine a difference between the second temperature and the first temperature. In another, BMC 185 may determine a difference between the second temperature and the first temperature.

At 725, it may be determined that the difference between the second temperature and the first temperature is greater than or equal to a threshold. In one example, liquid management system 462 may determine that the difference between the second temperature and the first temperature is greater than or equal to a threshold. In another example, BMC 185 may determine that the difference between the second temperature and the first temperature is greater than or equal to a threshold. In one or more embodiments, determining that the difference between the second temperature and the first temperature is greater than or equal to the threshold may indicate that heat is not being transferred from IHS 110. In one or more embodiments, determining that the difference between the second temperature and the first temperature is greater than or equal to the threshold may indicate that a slow flow rate of liquid 220 within liquid distribution system 460.

At 730, an alert may be provided. In one example, liquid management system 462 may provide the alert. In another example, BMC 185 may provide the alert. In one or more embodiments, the alert may be provided in response to determining that the difference between the second temperature and the first temperature is greater than or equal to the threshold.

Figure 7B:
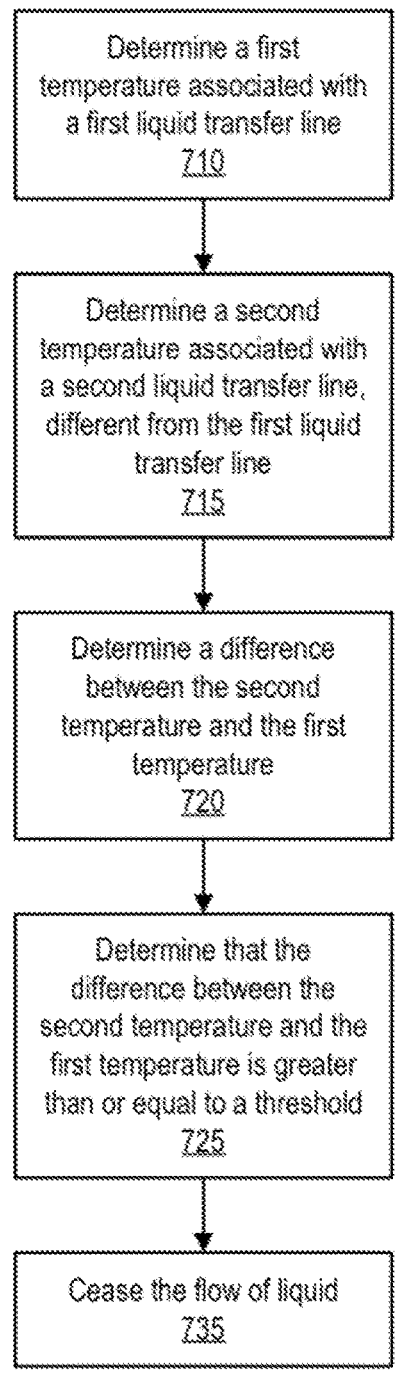
FIG. 7B illustrates an example of a third method of operating a liquid management system, according to one or more embodiments.

Turning now to FIG. 7B, an example of a third method of operating a liquid management system is illustrated, according to one or more embodiments. In one or more embodiments, method elements 710-725 of FIG. 7B may be performed in accordance with method elements 710-725 of FIG. 7A. At 735, the flow of the liquid may be ceased. For example, ceasing the flow of the liquid may include ceasing rotation of the impeller of the first impeller system. For instance, ceasing the flow of liquid 220 may include ceasing rotation of impeller 432A. In one or more embodiments, ceasing the flow of the liquid may be performed in response to determining that the difference between the second temperature and the first temperature is greater than or equal to the threshold.

In one or more embodiments, ceasing the flow of the liquid may include utilizing a solenoid to cease rotation of the impeller of the first impeller system. In one example, a solenoid may be engaged to cease rotation of the impeller of the first impeller system. For instance, ceasing rotation of the impeller of the first impeller system may cease the flow of the liquid. In another example, a solenoid may be disengaged to cease rotation of the impeller of the first impeller system. For instance, ceasing rotation of the impeller of the first impeller system may cease the flow of the liquid. In one or more embodiments, liquid management system 462 may control the solenoid. In one example, liquid management system 462 may engage solenoid 482. In another example, liquid management system 462 may disengage solenoid 482. In one or more embodiments, BMC 185 may control the solenoid. In one example, BMC 185 may engage solenoid 482. In another example, BMC 185 may disengage solenoid 482. In one or more embodiments, controlling the solenoid may include the solenoid controlling positions of a rod. In one example, a first position of the rod may permit the impeller of the first impeller system to rotate. In another example, a second position of the rod prevent the impeller of the first impeller system from rotating.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A liquid management system, configured to be coupled to an information handling system, comprising:
   a first impeller system that includes a first impeller and a first liquid transfer line, the first liquid transfer line coupled between the first impeller and an information handling system, wherein the first impeller system is configured to:
      transfer a first flow of liquid via the first liquid transfer line to cool at least one component of the information handling system; and
      harvest, via rotation of the first impeller, energy from the first flow of the liquid;
   a second impeller system that includes a second impeller, a second liquid transfer line, and a third liquid transfer line, the second liquid transfer line coupled between the second impeller and the information handling system, the third liquid transfer line coupled between the second impeller and a tap, wherein the second impeller system is configured to:
      receive a second flow of liquid via the second liquid transfer line from the information handling system;
      rotate, via at least a portion of the energy, the second impeller to create a pressure difference between the second liquid transfer line and the third liquid transfer line including creating a vacuum pressure within the second liquid transfer line to extract the liquid from the first liquid transfer line and the second liquid transfer line; and
   a shaft, coupled to the first impeller system and coupled to the second impeller system, configured to transfer the at least the portion of the energy to the second impeller system.

2. The liquid management system of claim 1, wherein the shaft is further configured to rotate to transfer the at least the portion of the energy to the second impeller system.

3. The liquid management system of claim 1, further comprising:
   a solenoid configured to prevent a rotation of the first impeller.

4. The liquid management system of claim 1, further comprising:

a gear coupled to the shaft,
wherein a diameter of the second impeller is equal to a diameter of the first impeller, and
wherein, for a complete rotation of the first impeller, the gear causes more than a complete rotation of the second impeller.

5. The liquid management system of claim 1, wherein the first impeller system includes multiple impellers.

6. The liquid management system of claim 1, wherein the second impeller system includes multiple impellers.

7. The liquid management system of claim 1, further comprising:
a check valve configured to prevent at least a portion of the liquid from flowing back into the information handling system.

8. The liquid management system of claim 1, further comprising:
a check valve configured to prevent at least a portion of the liquid from flowing back into the first impeller system.

9. The liquid management system of claim 1, further comprising:
a temperature measurement device configured to determine a temperature associated with the second liquid transfer line.

10. The liquid management system of claim 9, wherein the temperature measurement device includes at least one of a resistance temperature detector, a thermocouple, and a thermistor.

11. The liquid management system of claim 9, wherein the temperature measurement device is coupled to the second liquid transfer line.

12. A method, comprising:
transferring a first flow of liquid via a first liquid transfer line to cool at least one component of an information handling system, the first liquid transfer line coupled between a first impeller of a first impeller system and the information handling system;
harvesting energy from the first flow of the liquid via the first impeller of the first impeller system;
receiving a second flow of fluid via a second transfer line from the information handling system, the second liquid transfer line coupled between a second impeller of a second impeller system and the information handling system;
transferring, via at least one of a gear and a shaft, at least a portion of the energy from the first flow of the liquid to the second impeller of the second impeller system, the second impeller system including a third liquid transfer line coupled between the second impeller and a tap; and
rotating, via the at least the portion of the energy, the second impeller of the second impeller system to create a pressure difference between the second liquid transfer line and the third liquid transfer line including creating a vacuum pressure within the second liquid transfer line to extract the liquid from the first liquid transfer line and the second liquid transfer line.

13. The method of claim 12, wherein the transferring, via the at least one of the gear and the shaft, the at least the portion of the energy from the flow of the liquid to the second impeller includes the shaft rotating to transfer the at least the portion of the energy from the flow of liquid to the second impeller.

14. The method of claim 12, further comprising:
determining a first temperature associated with a first liquid transfer line;
determining a second temperature associated with a second liquid transfer line, different from the first liquid transfer line;
determining a difference between the second temperature and the first temperature;
determining that the difference between the second temperature and the first temperature is greater than or equal to a threshold; and
in response to the determining that the difference between the second temperature and the first temperature is greater than or equal to the threshold, providing an alert.

15. The method of claim 12, further comprising:
determining a first temperature associated with a first liquid transfer line;
determining a second temperature associated with a second liquid transfer line, different from the first liquid transfer line;
determining a difference between the second temperature and the first temperature;
determining that the difference between the second temperature and the first temperature is greater than or equal to a threshold; and
in response to the determining that the difference between the second temperature and the first temperature is greater than or equal to the threshold, ceasing the flow of liquid.

16. The method of claim 15, wherein the ceasing the flow of liquid includes a solenoid preventing a rotation of the impeller of the first impeller system.

17. The method of claim 12,
wherein a diameter of the impeller of the second impeller system is equal to a diameter of the impeller of the first impeller system,
wherein the transferring, via the at least one of the gear and the shaft, the at least the portion of the energy from the flow of the liquid to the impeller of the second impeller system includes transferring, via at least the gear, the at least the portion of the energy from the flow of the liquid to the impeller of the second impeller system, and
wherein, for a complete rotation of the impeller of the first impeller system, the gear causes more than a complete rotation of the impeller of the second impeller system.

18. The method of claim 12, wherein the first impeller system includes a plurality of impellers that include the impeller of the first impeller system.

19. The method of claim 12, wherein the second impeller system includes a plurality of impellers that include the impeller of the second impeller system.

20. The method of claim 12, further comprising:
providing at least a portion of the liquid to a check valve.

* * * * *